US012596273B2

(12) United States Patent
Su et al.

(10) Patent No.: US 12,596,273 B2
(45) Date of Patent: Apr. 7, 2026

(54) ELECTRONIC DEVICE

(71) Applicant: Lenovo (Beijing) Limited, Beijing (CN)

(72) Inventors: Yuefeng Su, Beijing (CN); Xiangfeng Guo, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/608,632

(22) Filed: Mar. 18, 2024

(65) Prior Publication Data

US 2024/0329446 A1 Oct. 3, 2024

(30) Foreign Application Priority Data

Mar. 31, 2023 (CN) .......................... 202310343490.4

(51) Int. Cl.
*G02F 1/133* (2006.01)
*G02F 1/13357* (2006.01)
*G02F 1/1362* (2006.01)

(52) U.S. Cl.
CPC .... *G02F 1/13318* (2013.01); *G02F 1/133609* (2013.01); *G02F 1/136209* (2013.01); *G02F 2201/06* (2013.01); *G02F 2201/58* (2013.01)

(58) Field of Classification Search
CPC .......... G02F 1/133609; G02F 2201/58; G02F 1/13318; G02F 1/133308; G02F 1/133314; G02F 1/133317
See application file for complete search history.

(56) References Cited

U.S. PATENT DOCUMENTS

| 2006/0007097 A1* | 1/2006 | Ichikawa | ............. | G09G 3/3413 |
| | | | | 345/207 |
| 2007/0222741 A1* | 9/2007 | Itaya | .................... | G09G 3/3406 |
| | | | | 345/102 |
| 2019/0137802 A1* | 5/2019 | Yamada | ............ | G02F 1/134309 |

FOREIGN PATENT DOCUMENTS

| CN | 112526779 A | * | 3/2021 | .......... | G02F 1/1333 |
| JP | 2007018846 A | * | 1/2007 | | |
| KR | 2008089008 A | * | 10/2008 | | |

* cited by examiner

*Primary Examiner* — Alexander P Gross
(74) *Attorney, Agent, or Firm* — ANOVA LAW GROUP, PLLC

(57) ABSTRACT

An electronic device includes: a backlight module configured to emit a backlight; a display module disposed a light-emitting side of the backlight module and configured to emit a display light based on the backlight; and a photosensitive component configured to detect the backlight.

10 Claims, 7 Drawing Sheets

ELECTRONIC DEVICE

CROSS-REFERENCE TO RELATED APPLICATION

This application claims priority to Chinese Patent Application No. 2023103434904, filed on Mar. 31, 2023, and the entire content of which is incorporated herein by reference.

TECHNICAL FIELD

The present disclosure relates to the technical field of electronic device technology, and more particularly, to an electronic device.

BACKGROUND

With the continuous development of science and technology, more electronic devices with display functions are widely used in people's daily life and work. These electronic devices have brought great convenience to people's daily life and have become indispensable tools for people today.

For a display module that does not actively emit light, such as an LCD (liquid crystal display) module, images will be displayed based on a backlight emitted by a backlight module. Generally, the backlight module emits white visible light as the backlight, and the display module controls the transmittance of the visible light of three primary colors of red, green, and blue in the white backlight based on the pixel structure array to display the images.

When an electronic device displays images, if the backlight does not satisfy display requirements, the image display quality will be degraded.

SUMMARY

One aspect of the present disclosure provides an electronic device. The electronic device includes: a backlight module configured to emit a backlight; a display module disposed a light-emitting side of the backlight module and configured to emit a display light based on the backlight; and a photosensitive component configured to detect the backlight.

BRIEF DESCRIPTION OF THE DRAWINGS

To more clearly describe the technical solutions in the embodiments of the present disclosure or related technologies, the accompanying drawings that need to be referenced in the description of the embodiments or the prior art will be briefly described below. Obviously, the drawings in the following description are merely some embodiments of the present disclosure. Those of ordinary skill in the art may also obtain other drawings based on the provided drawings without creative efforts.

The structures, proportions, sizes, etc. shown in the accompanying drawings of the specification are merely used to illustrate the contents disclosed in the specification and are intended for comprehension and understanding by people familiar with the technology. They are not intended to limit the scope of the present disclosure. Therefore, they are not technically essential. Any structural modifications, changes in proportions, or adjustments in size shall still fall within the scope of the technical solutions disclosed in the present disclosure as long as they do not affect the functions and technical benefits that the present disclosure provides.

DETAILED DESCRIPTION OF THE EMBODIMENTS

The embodiments in the present disclosure will be clearly and completely described below with reference to the accompanying drawings in the embodiments of this application. Obviously, the described embodiments are merely some of the embodiments of the present disclosure, rather than all of the embodiments. Based on the embodiments in the present disclosure, all other embodiments obtained by those of ordinary skill in the art without creative efforts fall within the scope of the present disclosure.

To make the above objectives, features, and advantages of the present disclosure more obvious and understandable, the present disclosure will be described in further detail below in conjunction with the accompanying drawings and various embodiments.

Figure 1:
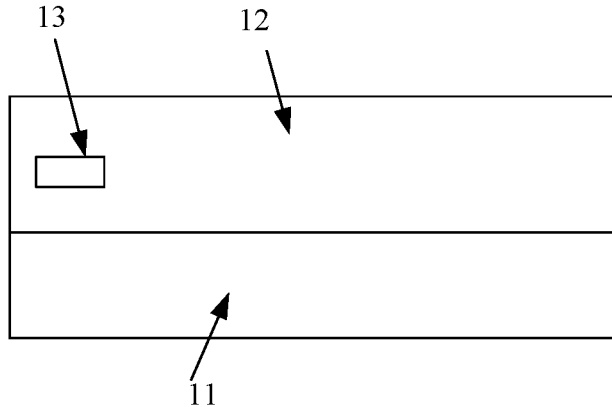
FIG. 1 is a structural diagram of an electronic device according to some embodiments of the present disclosure.

FIG. 1 is a structural diagram of an electronic device according to some embodiments of the present disclosure. As shown in FIG. 1, the electronic device includes: a backlight module 11 configured to emit backlight, a display module 12 disposed at a light-emitting side of the backlight module 11 and configured to emit a display light based on the backlight, and a photosensitive component 13 configured to detect the backlight.

The electronic device provided by the technical solution of the present disclosure is integrated with the photosensitive component 13, and the photosensitive component 13 can detect the backlight, such that the electronic device has a function of detecting the backlight.

In some embodiments, the electronic device may determine whether the backlight satisfies a display requirement based on a backlight detection result.

Furthermore, when the backlight does not satisfy the display requirement, the electronic device may control the display module 12 and/or the backlight module 11 to solve display deviation caused by backlight deviation.

If the backlight detection result indicates that the current backlight deviates from a standard backlight, the following processes may be performed to avoid color shift/brightness deviation in a display image of the electronic device. For example, a backlight parameter of the backlight module 11 may be adjusted based on the backlight detection result, such that the backlight emitted by the backlight module 11 satisfies a same condition as the standard backlight. That is, the backlight emitted by the backlight module 11 is the same or approximately the same as the standard backlight. In another example, a display parameter of the display module 12 is adjusted based on the backlight detection result to compensate color/brightness deviation in the display image of the electronic device caused by deviation of the current backlight from the standard backlight.

In some embodiments, as shown in FIG. 1, a space in display module 12 may be used to integrate the photosensitive component 13 into the display module 12. Or the space in the backlight module 11 may be used to integrate the photosensitive component 13 into the backlight module 11. Thus, the electronic device is more integrated to facilitate a miniaturization design.

Figure 2:
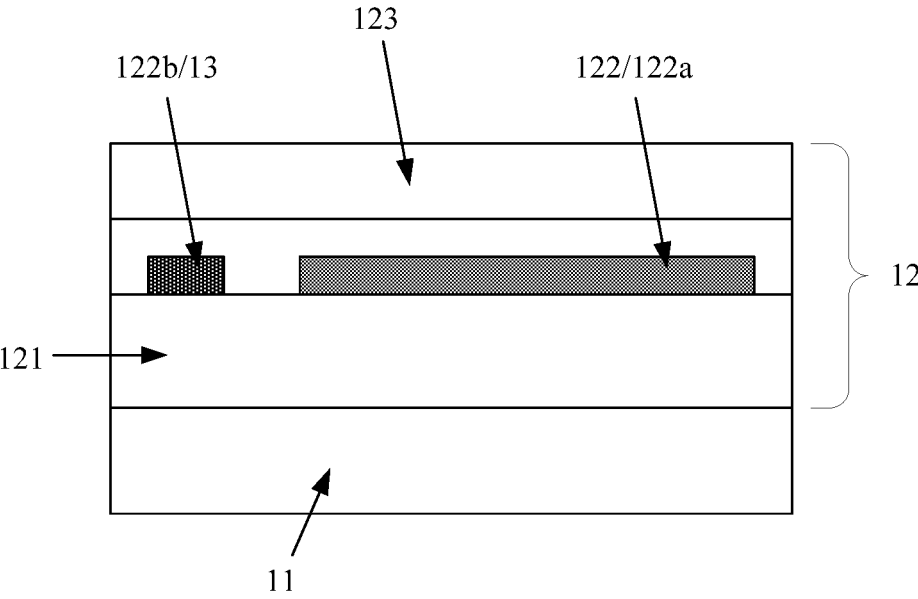
FIG. 2 is a structural diagram of another electronic device according to some embodiments of the present disclosure.

FIG. 2 is a structural diagram of another electronic device according to some embodiments of the present disclosure. As shown in FIG. 2, the display module 12 in the electronic device includes: a first substrate 121, a semiconductor structure array 122 disposed on a side of the first substrate 121 facing away from the backlight module 11, and a pixel structure array 123. The semiconductor structure array 122 is disposed between the first substrate 121 and the pixel structure array 123. The semiconductor structure array 122 includes: a first semiconductor structure array 122a configured to control pixel structures in the pixel structure array 123 to convert the backlight into display light, and a second semiconductor structure array 122b configured to be the photosensitive component 13. The second semiconductor structure array 122b may generate a current representing a backlight intensity based on light irradiation from the backlight.

Based on the method shown in FIG. 2, a second semiconductor structure array 122b may be included as the photosensitive component 13. The first semiconductor structure array 122a and the second semiconductor structure array 122b may be formed at the same time. The manufacturing process of forming the first semiconductor structure array 122a and the second semiconductor structure array 122b may be compatible with that of the display module 12 High, and no separate processes need to be added to form the photosensitive component 13.

The semiconductor structure array 122 includes a plurality of semiconductor structures arranged in an array. A part of the semiconductor structures in the semiconductor structure array 122 serves as first semiconductor structures in the first semiconductor structure array 122a and is configured to control the pixel structures in the pixel structure array 123 to convert the backlight into the display light to achieve image display. Another part of the semiconductor structures in the semiconductor structure array 122 serves as second semiconductor structures in the second semiconductor structure array 122b and is configured to generate a current representing the backlight intensity based on the light irradiation from the backlight. The pixel structure array 123 includes a plurality of pixel structures arranged in an array, and the pixel structures include pixel electrodes.

To improve the photosensitivity accuracy of the second semiconductor structures, a target area of the second semiconductor structures is doped with rare metals to improve the generation of the photogenerated current. The rare metals include lanthanide series metals.

In the embodiments of the present disclosure, the display module is a liquid crystal display module. A liquid crystal layer is provided on the side of the pixel structure array 123 facing away from the first substrate 121, and a second substrate is provided on the side of the liquid crystal layer facing away from the first substrate 121. The surface of the second substrate includes filters that correspond to the pixel structures in one-to-one correspondence (i.e., second filters below). Through the second filters with different light transmittance colors, the pixel structures control the light transmittance of the three primary colors of red, green, and blue in the backlight.

The semiconductor structures in semiconductor array 122 are thin film transistors (TFTs). That is, the first semiconductor structures and the second semiconductor structures are both thin film transistors. An active area of a thin film transistor may generate a current under light irradiation, and the intensity of the current is related to the light intensity. Based on this characteristic of the thin film transistor, the thin film transistor can be used as photosensitive component 13 for backlight detection.

The electronic device includes a display area and a non-display area surrounding at least one side of the display area. The first semiconductor structure array 122a and the pixel structure array 123 are both located in the display area. To prevent the first semiconductor structures from affecting the light emitted from pixel areas where the pixel structures are located, no overlap exists between the first semiconductor structures and the pixel areas in the direction perpendicular to the plane of the first substrate 121. That is, the first semiconductor structures are located in pixel gaps between the pixel areas.

In the direction perpendicular to the plane of the first substrate 121, the second semiconductor structures may be disposed in the display area and in the pixel gaps between the pixel areas.

Generally, the sizes of the pixel areas and the pixel gaps are small in high-resolution electronic devices. To provide the second semiconductor structure array 122b with sufficient layout space, to make it convenient to arrange the second semiconductor structure array 122b, and to prevent the layout of the second semiconductor structure array 122 from affecting the pixel structures and the first semiconductor structure array 122a in the display area, the second semiconductor structure array 122b may be disposed in the non-display area.

Figure 3:
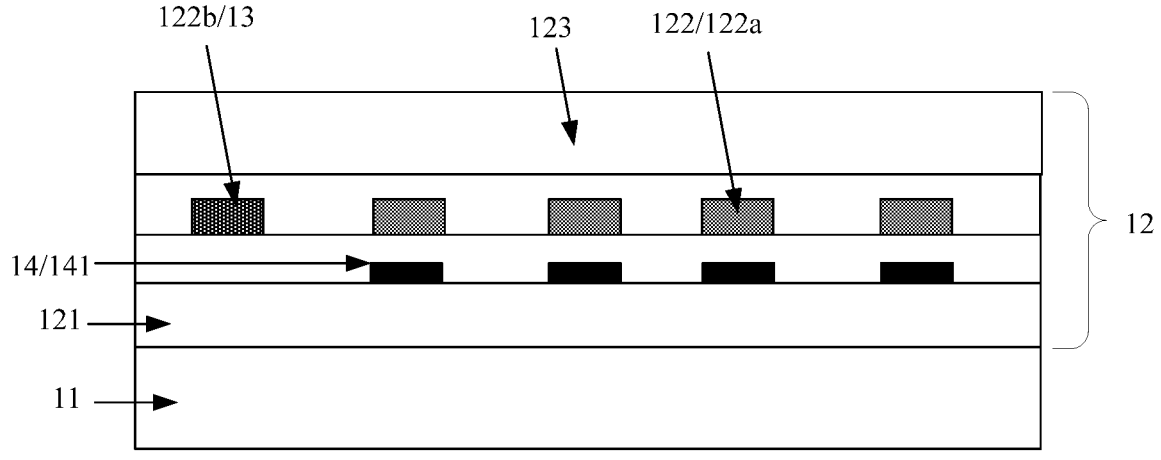
FIG. 3 is a structural diagram of another electronic device according to some embodiments of the present disclosure.

FIG. 3 is a structural diagram of another electronic device according to some embodiments of the present disclosure. Based on the electronic device shown in FIG. 2, in the electronic device shown in FIG. 3, a first light shielding component 14 is provided on the surface of the first substrate 11. The first light shielding component 14 is located on a target area path in which the backlight irradiates on the first semiconductor structures in the first semiconductor structure array 122a. The first light shielding component 14 is located outside another target area path in which the backlight irradiates on the second semiconductor structures in the second semiconductor structure array 122b. The target area is an area of the semiconductor structures that can generate current when exposed to light.

As shown in FIG. 3, the first light shielding component 14 is located on the surface of the first substrate 121. The first light shielding component 14 is not limited to being located on the surface of the first substrate 121 facing toward the semiconductor structure array 122. The first light shielding component 14 may also be located on the surface of the first substrate 121 facing away from the semiconductor structure array 122.

The first light shielding component 14 is located on the target area path in which the backlight irradiates the target area of the first semiconductor structures in the first semiconductor structure array 122a. The arrangement of the first light shielding component 14 reduces or even eliminates the backlight irradiation on the target area of the first semiconductor structures, thereby preventing the illumination current generated in the target area of the semiconductor structures from affecting a display control signal. Further, the first light shielding component 14 is disposed outside the path of the backlight illuminating the target area of the second semiconductor structures in the second semiconductor structure array 122b, such that the backlight can illuminate the target area of the second semiconductor structures. The backlight illuminates the target area of the second semiconductor structures to generate the illumination current to facilitate the backlight detection.

In the direction perpendicular to the plane of the first substrate 121, the target area of the first semiconductor structures is arranged to at least partially overlap the first light shielding component 14, such that the first light shielding component 14 blocks the backlight from irradiating the target area of the first semiconductor structures to prevent the first semiconductor structures from generating the illumination current. The arrangement of no overlap between the target area of the second semiconductor structures and the first light shielding component 14 facilitates the backlight to illuminate the target area of the second semiconductor structures. Thus, the second semiconductor structures can generate the illumination current.

As mentioned above, the semiconductor structures in the semiconductor structure array 122 may be thin film transistors. The target area is the active area of the thin film transistor. In the display module 12, to prevent the current generated by the backlight irradiation of the first semiconductor structures in the display area from interfering with the display control signal, the first light shielding component 14 needs to be provided between the first semiconductor structure array 122a and the backlight module 11. Thus, the backlight is prevented from illuminating the target area of the first semiconductor structures.

The first light shielding component 14 includes a plurality of light shielding blocks 141 arranged in a one-to-one correspondence with the first semiconductor structures. A vertical projection of the target area of the first semiconductor structures on the first substrate 121 is located at the corresponding light shielding block 141 on the first substrate 121, such that the first light shielding component 14 is located on the path in which the backlight illuminates the target area of the first semiconductor structures. Thus, light shielding block 141 substantially shields the target area of the first semiconductor structures to prevent generating the illumination current.

The second semiconductor structures in the second semiconductor structure array 122b need to generate the illumination current based on the light irradiation from the backlight for detecting the backlight. Therefore, no overlap exists between the vertical projection of the target area of the second semiconductor structures on the first substrate 121 and the vertical projection of the first light shielding component 14 on the first substrate 121. The first light shielding component 14 is located outside the path in which the backlight irradiates on the target area of the second semiconductor structures. As such, the backlight irradiates on the target area of the second semiconductor structures to generate the illumination current for detecting the backlight.

The first light shielding component 14 is generally a patterned metal layer disposed on the surface of the first substrate 121. When the first light shielding component 14 is located between the first substrate 121 and the semiconductor structure array 122, to prevent a short circuit problem between the first light shielding component 14 and the semiconductor structure array 122, an insulating layer is provided between them.

Figure 4:
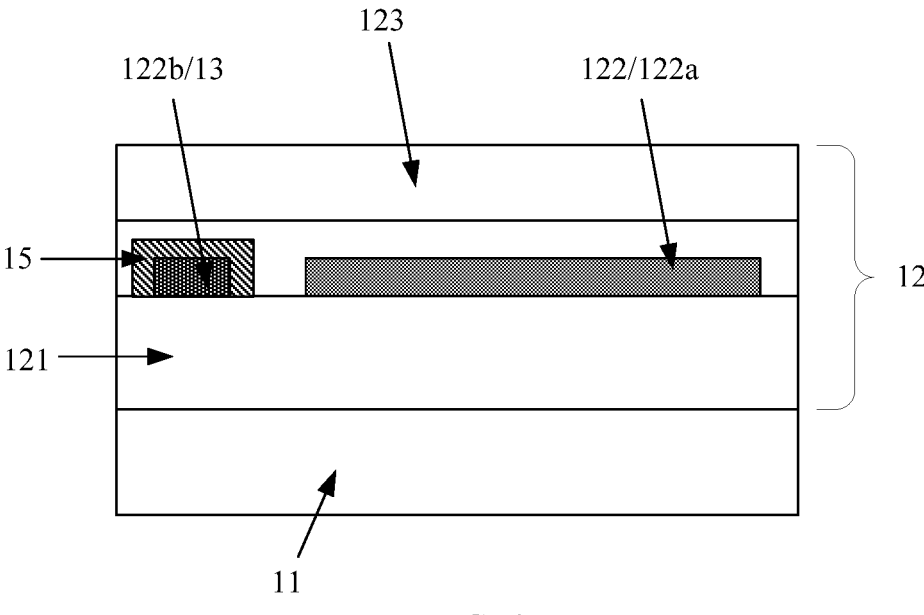
FIG. 4 is a structural diagram of another electronic device according to some embodiments of the present disclosure.

FIG. 4 is a structural diagram of another electronic device according to some embodiments of the present disclosure. Based on the above-described electronic devices, in the electronic device shown in FIG. 4, a second light shielding component 15 is disposed on the surface of the second semiconductor structures in the second semiconductor structure array 122b facing away from the backlight module 11. The second light shielding component 15 is used to absorb the backlight irradiating the area where the second light shielding component 15 is located and its surrounding area to prevent this part of the backlight from affecting the display effect. At the same time, the second light shielding component 15 may also prevent ambient light from irradiating the target area of the second semiconductor structures, thereby avoiding the ambient light interfering with the accuracy of the backlight detection.

It should be noted that the method shown in FIG. 4 illustrates the structure of the electronic device based on the method shown in FIG. 2. Obviously, the second light shielding component 15 may also be provided based on the method shown in FIG. 3.

The second light shielding component 15 covers at least the top surface of the second semiconductor structures facing away from the first substrate 121. To achieve a better display effect, the second light shielding component 15 may be arranged to also surround side walls of the second semiconductor structures.

The backlight emitted by the backlight module 11 is white light. The display module 12 may control the transmittance of red light, green light, and blue light (three primary colors of visible light) in the white light based on the pixel structure array 123 to achieve color image display.

In the embodiments of the present disclosure, one method may directly detect the white backlight through the photosensitive component 13, thereby detecting the intensity of the backlight, and based on the detection result, it can be determined whether the current backlight has a brightness deviation relative to the standard backlight.

In another method, at least one color of red light, green light, and blue light in the white backlight may be detected through the photosensitive component 13 to obtain the intensity of the monochromatic light in the backlight. Based on the detection result, whether a brightness deviation of a certain color light in the current backlight relative to the same color light in the standard backlight occurs is determined. The structure of the electronic device as shown in FIG. 5 may be used to perform backlight detection.

Figure 5:
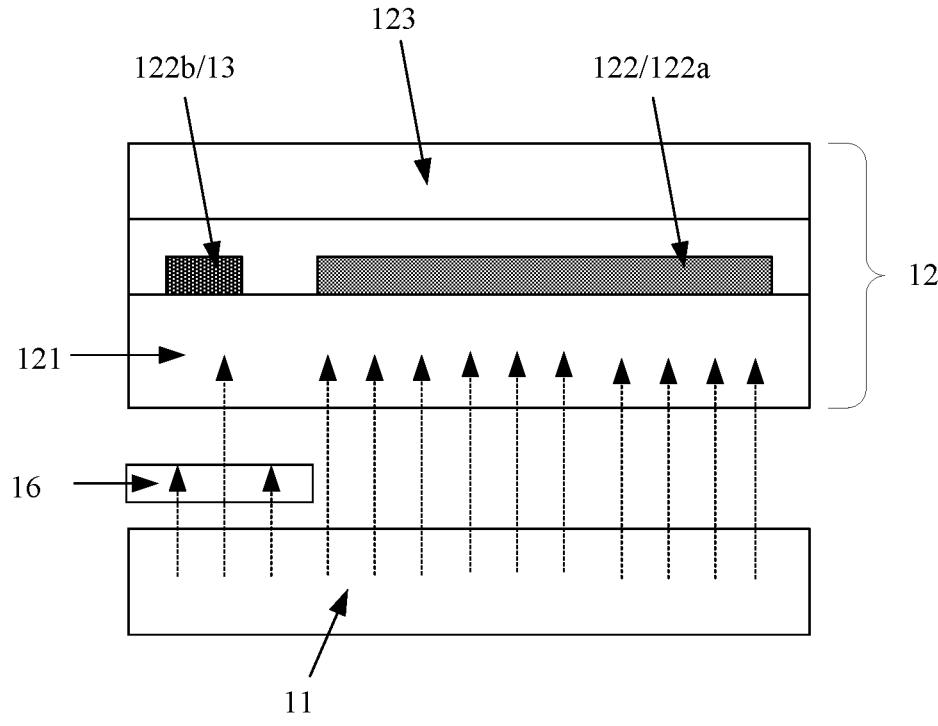
FIG. 5 is a structural diagram of another electronic device according to some embodiments of the present disclosure.

FIG. 5 is a structural diagram of another electronic device according to some embodiments of the present disclosure. Based on the above-described electronic devices, in the electronic device shown in FIG. 5, a first filter 16 is disposed on the path in which the backlight irradiates on the photosensitive component 13. The first filter 16 is configured to pass a first color light in the backlight, such that the second semiconductor structure array 122*b* can detect the intensity of the first color light in the backlight. The dotted line arrows in FIG. 5 are used to indicate the backlight.

The method shown in FIG. 5 illustrates the structure of the electronic device based on the method shown in FIG. 2. Obviously, the first filter 16 may also be provided based on the method shown in FIG. 3 or FIG. 4.

By providing the first filter 16, the photosensitive component 13 may detect the intensity of the first color light in the backlight. When displaying a picture with a set brightness, the brightness of the required standard backlight is determined. Based on the brightness of the standard backlight, the brightness of each of the three primary color lights in the standard backlight is also determined.

Based on the detection result of the first color light, whether the brightness deviation of the first color light in the current backlight exists relative to the first color light in the standard backlight may be determined. The first color light may be any one of the three primary color lights.

In some embodiments, the electronic device is configured to include two different first filters 16. The two first filters 16 respectively correspond to different second semiconductor structure arrays 122*b*. The first color light passed by the two first filters 16 corresponds to different colors, and is one of red light, green light, and blue light, respectively. As such, it is possible to detect whether the brightness deviation in two of the red light, green light, and blue light in the backlight exists, and further to determine whether the brightness deviation in a third of the red light, green light, and blue light in the backlight exists.

When it is uncertain whether the backlight emitted by the backlight module 11 satisfies the intensity of the standard backlight, based on the method shown in FIG. 5, whether the brightness deviation in at least one of the red light, green light and blue light of the current backlight relative to the same color light in the standard backlight exists can be determined.

Figure 6:
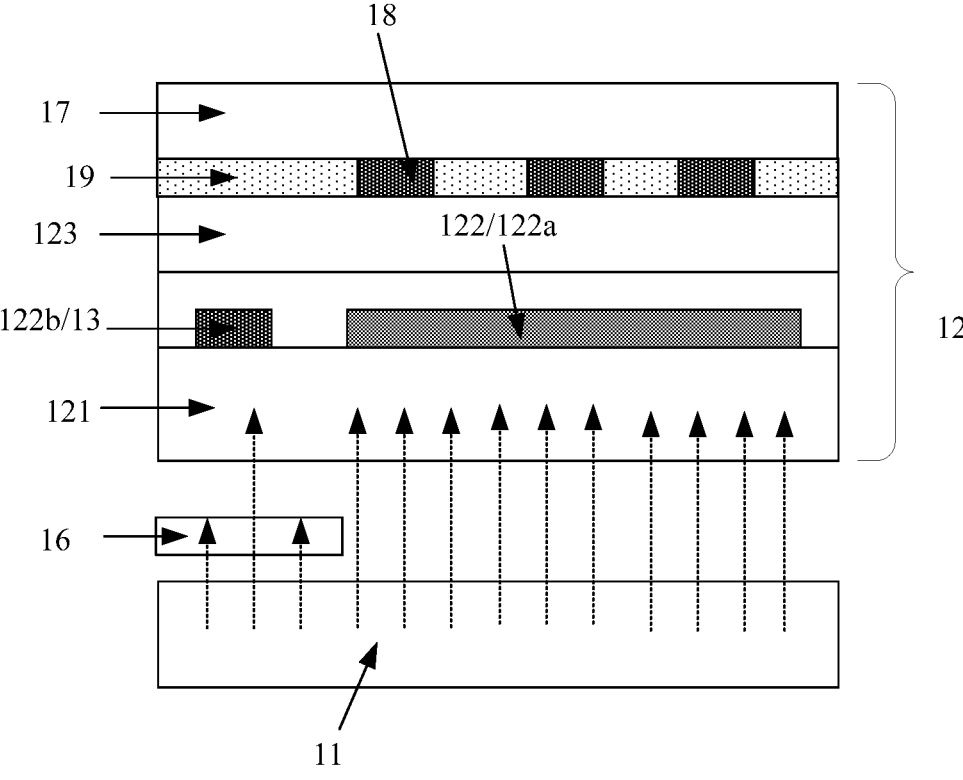
FIG. 6 is a structural diagram of another electronic device according to some embodiments of the present disclosure.

FIG. 6 is a structural diagram of another electronic device according to some embodiments of the present disclosure. As shown in FIG. 6, a second substrate 17 is provided on the light-emitting side of the pixel structure array 123. A second filter 18 is provided on the surface of the second substrate 17 facing toward the pixel structure array 123. The second filter 18 is used to pass the first color light in the display light. The first filter 16 and the second filter 18 share the same manufacturing process parameters.

There are two methods to achieve the same manufacturing process parameters for the first filter 16 and the second filter 18. In the first method, the first filter 16 and the second filter 18 are different parts of the same filter, such that the first filter 16 and the second filter 18 share the same process parameters. In this method, a large-sized filter may be prepared first, and then divided into a plurality of small-sized filters. The small-sized filters are used to be installed at set positions of the electronic device to serve as the first filter 16 and the second filter 18, respectively.

In the second method, the second substrate 17 and a target component are arranged in a same device, and the same equipment is used to simultaneously form the filters on the surface of the second substrate 17 and the target component. The filter formed on the surface of the second substrate 17 is the second filter 18. The filter formed on the surface of the target component is the first filter 16. As such, the first filter 16 and the second filter 18 share the same manufacturing process parameters. The target component is a structural component in the electronic device that requires the first filter 16.

The operating temperature and the driving current of the backlight module 11 may affect the brightness and chromaticity of the backlight. Before the backlight module 11 and the display module 12 are assembled, the backlight module 11 may be inspected for luminescence to determine standard operating parameters when the backlight module 11 emits the standard backlight. The standard operating parameters may include parameters such as the operating temperature and the driving current. When the electronic device controls the backlight module 11 to operate based on the above-described standard operating parameters, the current backlight emitted from the backlight module 11 may be the standard backlight without the color deviation or the brightness deviation. Therefore, when the backlight emitted by the backlight module 11 is the standard backlight, the proportions of red light, green light, and blue light in the current backlight are the same. The brightness of the first color light in the current backlight is a set value, which is one third of the standard backlight brightness.

In the electronic device shown in FIG. 6, a color deviation amount of the second filter 18 may be determined based on the detection result of the first color light by the photosensitive component 13. Because the manufacturing process parameters of the first filter 16 and the second filter 18 are the same, the first filter 16 and the second filter 18 share the same light transmittance property. When the detection result and the above-described satisfy the same condition, it can be determined that the second filter 18 has no light transmittance color deviation. On the contrary, when the absolute value of a difference between the detection result and the above-described set value is greater than a set threshold, it indicates that the second filter 18 has the light transmittance color deviation. The color deviation amount is positively related to the above-described absolute value of the difference. The color deviation amount of the second filter 18 may be determined based on the absolute value of the difference. Based on the color deviation amount, the display control signal of the display module may be adjusted to compensate for the color deviation amount and avoid the color deviation problem in the displayed image.

The second filter 18 for passing blue light, the second filter 18 for passing green light, and the second filter 18 for passing red light are provided on the surface of the second substrate 17, such that the display module 12 can display color images.

When the first filter 16 for passing blue light is provided, based on the detection result of the backlight by the photosensitive component 13 corresponding to the first filter 16, whether the second filter 18 for passing blue light on the second substrate 17 has a color deviation can be determined. When the first filter 16 for passing green light is provided, based on the detection result of the backlight by the photosensitive component 13 corresponding to the first filter 16, whether the second filter 18 for passing green light on the second substrate 17 has a color deviation can be determined. When the first filter 16 for passing red light is provided, based on the detection result of the backlight by the photosensitive component 13 corresponding to the first filter 16, whether the second filter 18 for passing red light on the second substrate 17 has a color deviation can be determined.

In the embodiment of the present disclosure, at least one of the first filter 16 for passing blue light, the first filter 16 for passing green light, and the first filter 16 for passing red light is included. Each first filter 16 for different color lights is respectively provided with an independent second semiconductor structure array 122*b*, that is, a corresponding photosensitive element 13 is provided.

As described above, display module 12 is a liquid crystal display module. The liquid crystal display module includes an array substrate and a color filter substrate arranged opposite to each other, and a liquid crystal layer disposed between the array substrate and the color filter substrate. The color filter substrate includes: a first substrate 121, and a semiconductor structure array 122 and a pixel structure array 123 disposed on the surface of the first substrate 121. The color filter substrate includes: a second substrate 17 and a second filter 18 disposed on the surface of the second substrate 17. The second filter 18 is a color resistance unit. The liquid crystal layer is not shown in the drawings of the embodiments of the present disclosure. As described above, the embodiments of the present disclosure may detect whether the color deviation problem exists in the color resistance unit in the color filter substrate. A black matrix 19 is disposed on a surface of the second substrate 17 facing toward the first substrate 11. The black matrix 19 includes pixel openings corresponding to the pixel areas in one-to-one correspondence for arranging the second filter 18.

Figure 7:
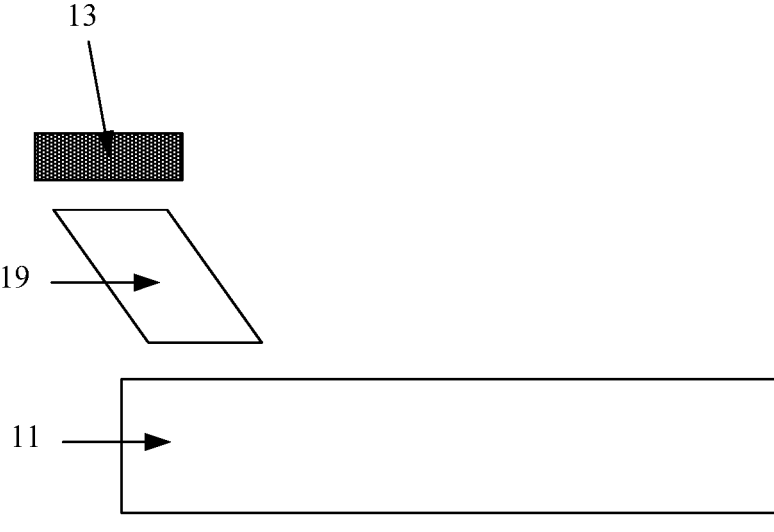
FIG. 7 is a structural diagram of another electronic device according to some embodiments of the present disclosure.

FIG. 7 is a structural diagram of another electronic device according to some embodiments of the present disclosure. Based on any of the above-described embodiments, the electronic device shown in FIG. 7 also includes a light guide structure 19. The light guide structure 19 includes a first end and a second end. The first end faces toward the backlight module 11 and the second end faces toward the photosensitive component 13. The light guide structure 19 is used to collect the backlight at the first end, guide the collected backlight along a light transmittance path defined by the light guide structure 19 to emit from the second end to the photosensitive component 13.

For convenience of illustration, FIG. 7 only shows the backlight module 11, the light guide structure 19, and the photosensitive component 13. Other structures of the electronic device are not shown. For detailed description of other structures, reference can be made to any of the above-described embodiments, and the description thereof is omitted. In any of the above-described embodiments, light guide structure 19 may be provided based on the principle shown in FIG. 7.

By arranging the light guide structure 19 in the electronic device, the backlight irradiates the photosensitive component 13 along the path defined by the light guide structure 19. This arrangement facilitates the assembling layout of the photosensitive component 13 in the electronic device and makes it more flexible for the assembling of the photosensitive component 13 in the electronic device. Moreover, the light guide structure 19 may also increase the incidence rate of the backlight entering the photosensitive component 13.

When the electronic device is provided with both the light guide structure 19 and the first filter 16, the first filter 16 is disposed between the first end of the light guide structure 19 and the backlight module 11, or between the second end of the light guide structure 19 and the photosensitive component 13. In some embodiments, the first filter 16 is provided to cover the first end surface of the light guide structure 19, or the first filter 16 is provided to cover the second end surface of the light guide structure 19 to save space and improve integration.

Figure 8:
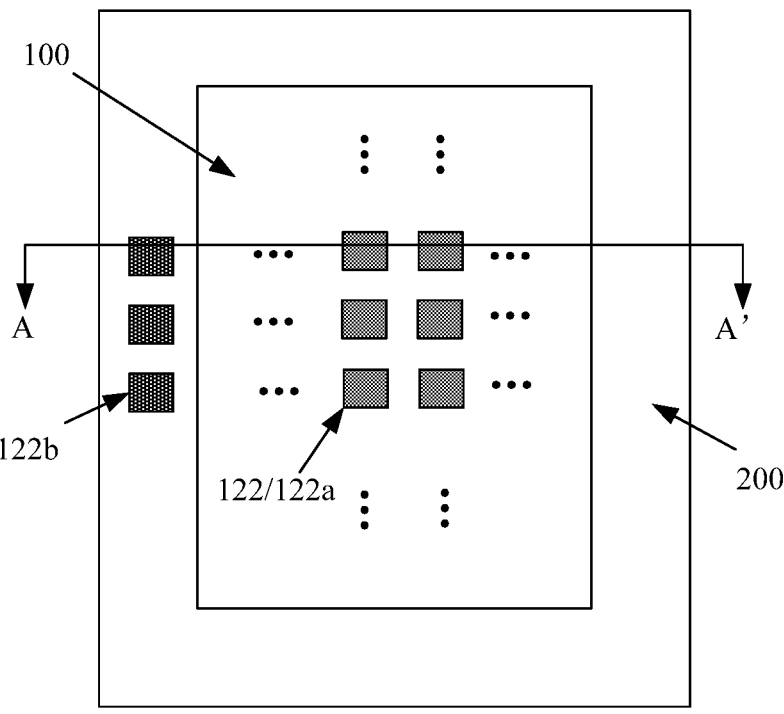
FIG. 8 is a top view of an electronic device according to some embodiments of the present disclosure.
Figure 9:
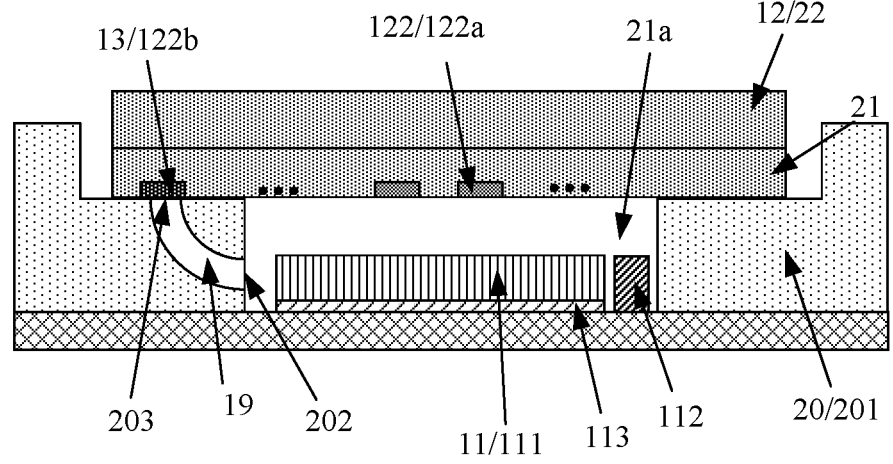
FIG. 9 is a cross-sectional view of an electronic device along A-A' direction as shown in FIG. 8.
Figure 10:
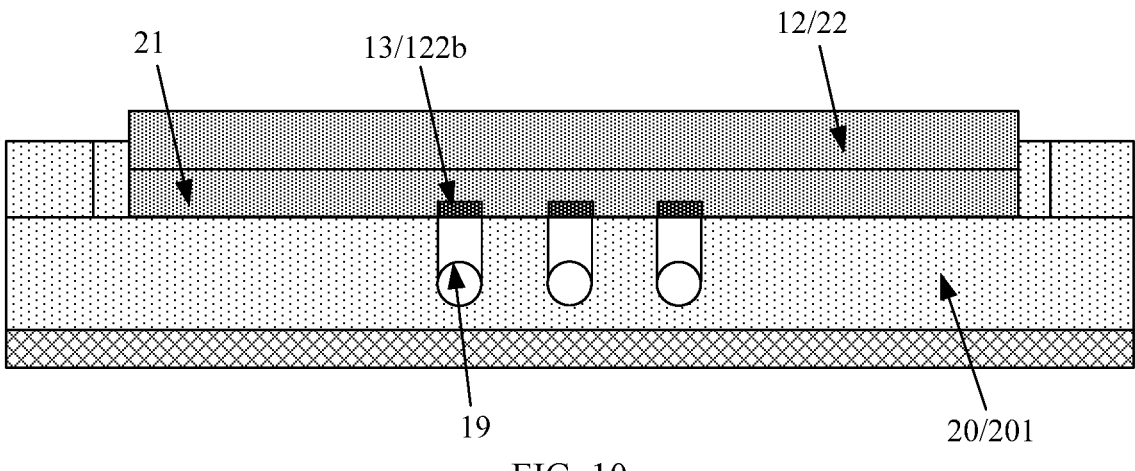
FIG. 10 is a cross-sectional view of an electronic device along B-B' direction as shown in FIG. 8.

FIG. 8 is a top view of an electronic device according to some embodiments of the present disclosure. FIG. 9 is a cross-sectional view of an electronic device along A-A' direction as shown in FIG. 8. FIG. 10 is a cross-sectional view of an electronic device along B-B' direction as shown in FIG. 8;

Based on the above-described embodiments, the electronic device shown in FIGS. 8-10 includes a display area 100 and a non-display area 200 surrounding at least one side of the display area 100. The first semiconductor structure array 122a is located in the display area 100, and the second semiconductor structure array 122b is located in the non-display area 200. The periphery of the surface of the display module 12 facing toward the backlight module 11 is fixedly mounted on frame 20. Frame 20 includes an accommodation space 21a for accommodating the backlight module 11. The light guide structure 19 is embedded in a body 201 of the frame 20. Frame 20 includes a first opening 202 on its inner wall facing toward the backlight module 11 to expose the first end of the light guide structure 19. Frame 20 includes a second opening 203 on its top facing toward the display module 12 to expose the second end of the light guide structure 19.

To avoid the problem that local display brightness of the electronic device is dim due to the provision of the first opening 202, a semi-reflective and semi-transparent coating may be provided inside the first opening 202. The first opening 202 may be arranged in an inner wall area where the backlight is relatively concentrated. For example, a light source in the backlight module is arranged to face toward the inner wall area. The first opening 202 is used to achieve backlight sampling while solving the problem of local over-brightness of the backlight.

In some embodiments, the first opening 202 is arranged to be larger than the second opening 203, which not only increases lighting, but also allows light to converge and irradiate on the photosensitive component 13, thereby improving the accuracy and sensitivity of the backlight detection.

Bi-shot molding technology may be used to embed the light guide structure 19 in the body 201 of the frame 20, which not only improves the integration level and saves the installation space of the light guide structure 19, but also enables the backlight to be transmitted based on the required path, while ensuring the intensity of the incident backlight.

To facilitate desired installation and mounting of the display module 12, a groove for installing and accommodating the display module 12 is provided on the top of the frame 20 facing toward the display module 12. The second opening 203 is located at the bottom of the groove corresponding to the area of the photosensitive component 13. Alternatively, the top of frame 20 may also be configured as a flat surface. The second opening 203 is located in the area of the flat surface corresponding to the photosensitive component 13. The display module 12 may be directly adhered and fixed on the flat surface using a double-sided tape.

In the electronic device as shown in FIGS. 8-10, the light guide structure 19 is embedded in frame 20 without occupying additional installation space of the electronic equipment, thereby facilitating a miniaturization design of the electronic device. Moreover, the second semiconductor structure array 122b is disposed in the non-display area 200, which has enough space to accommodate the second semiconductor structure array 122b without affecting the layout of the first semiconductor structure array 122a and the pixel structure array 123 in the display area 100.

The backlight module 11 also includes a light-emitting component 112, a light guide component 111, and a reflective component 113. The reflective member 113 is located on a surface of the light guide component 111 facing away from the display module 12. FIG. 9 shows an edge-type light source as an example for illustration. The light-emitting component 112 is located on a side of the light guide component 111. The backlight module 11 may also include a direct light source. That is, the light-emitting component 112 is disposed on a side of the light guide component 111 facing away from the display module 12.

To improve quality of the backlight emitted by the backlight module 11, an optical film layer structure may be provided on the surface of the light guide component 111 facing toward the display module 12. The optical film layer structure includes: a diffusion piece for improving uniformity of the backlight, and/or, a prism piece for improving backlight collimation. The optical film layer structure is not shown in FIG. 9.

The display module 12 includes the array substrate 21 and the color filter substrate 22 arranged opposite to each other, and the liquid crystal layer located between the array substrate 21 and the color filter substrate 22. The liquid crystal layer is not shown in FIG. 9. The array substrate 21 includes the first substrate 121, the semiconductor structure array 122, and the pixel structure array 123 in the above-described embodiments. The color filter substrate 22 includes the second substrate 17 and the second filter 18 in the above-described embodiments. Polarizers need to be provided on the side of the display module 12 facing away from the backlight module 11 and on the side of the display module 12 facing toward the backlight module 11. The polarizers are not shown in FIG. 9.

As shown in FIGS. 8-10, the electronic device is provided with multiple semiconductor structures simultaneously as the second semiconductor structure array 122b in an example for illustration. In the embodiments of the present disclosure, one semiconductor structure or multiple semiconductor structures may be provided as the second semiconductor structure array 122b based on requirements. When multiple semiconductor structures are provided as the second semiconductor structure array 122b, positions of the multiple semiconductor structures on the first substrate 11 may be arranged based on requirements, and are not limited to the non-display area 200 arranged on the same side of the display area 100 as shown in FIG. 8.

In some embodiments, a conversion component may be provided on the surface of either the first end or the second end of the light guide structure 19. The conversion component is used to convert the backlight into an infrared light. The photosensitive component 13 detects the backlight based on the infrared light. The conversion component may be an infrared quantum dot coating. The backlight may be converted into the infrared light by the conversion member. The photosensitive component 13 detects the backlight based on the infrared light. As such, when the directly irradiates on the photosensitive component 13, and some of the backlight not absorbed by the photosensitive component 13 enters the display module 12, the quality of the image display is not degraded.

Figure 11:
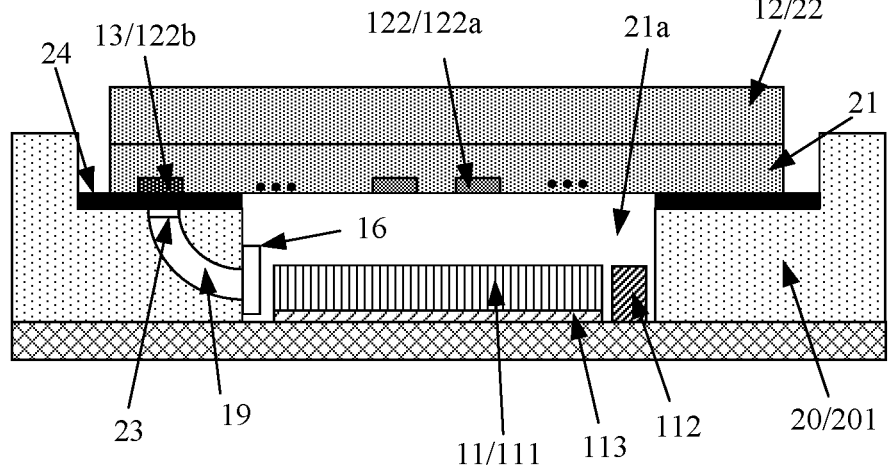
FIG. 11 is a structural diagram of another electronic device according to some embodiments of the present disclosure.

FIG. 11 is a structural diagram of another electronic device according to some embodiments of the present disclosure. As shown in FIG. 11, the electronic device is simultaneously provided with the first filter 16 and the conversion component 23 for converting the backlight into the infrared light. The first filter 16 covers the first end surface of the light guide structure 19, and the conversion component 23 covers the second end surface of the light guide structure 19. This arrangement allows only the first color light in the backlight to enter the light guide structure 19 through the first filter 16 and converts the first color light 19 into the infrared light at the second end, such that the photosensitive component 13 detects the infrared light converted from the first color light. Based on the detection result, the intensity of the first color light in the backlight is obtained.

As shown in FIG. 11, frame 20 and the bottom periphery of the display module 12 are adhesively fixed by a black double-sided tape 24. The black double-sided tape 24 covers the first end provided with the conversion component 23. The infrared light can pass through the black double-sided tape 24.

The backlight is substantially bright in the accommodation space 21a as shown in FIG. 11. The brightness of the backlight may reach more than 8,000 nits. Some backlight module 11 may reach more than hundreds of thousands of nits. To prevent the electronic device from leaking light into the non-display area 200, the black double-sided tape 24 is provided. With black double-sided tape 24, not only the bottom edge of the display component 12 and the frame 20 can be fixed, but also the leakage of the backlight in the relatively fixed area between the frame 20 and the display module 12 can be avoided. Thus, the degradation of the display effect is avoided.

In the embodiments of the present disclosure, the electronic device includes at least one of the following designs.

In the first design, the first end surface is provided with conversion component 23 for converting the backlight into the infrared light, and the photosensitive component 13 detects the backlight based on the infrared light. When the conversion component 23 and the first filter 16 are provided at the same time, the conversion component 23 is often disposed at the second end, and the first filter 16 is disposed at the first end. Alternatively, the conversion component 23 and the first filter 16 may also be arranged at a same end of the light guide structure 19. In this case, the first filter 16 needs to be disposed at the front end of the path of the backlight being transmitted to the photosensitive component 13. That is, the backlight passes through the first filter 16 before passing through the conversion component 23.

In the second design, the second end includes a light converging structure. The light converging structure is used to converge the light in light guide structure 19, and the converged light irradiates on the photosensitive component 13. The light converging structure may be a convex lens-shaped second end of the light guide structure 19.

In the third design, the second semiconductor structure array 122b includes at least two semiconductor structures to reduce the complexity of assembling related structures of the second semiconductor structures and to improve production yield. At the same time, one or more second semiconductor structures having the highest photogenerated current efficiency may be selected as the final photosensitive component 13 during a calibration process of determining the backlight intensity and required current. Moreover, photosensitive components 13 may be formed in multiple different areas of the electronic device to avoid the impact of local changes on the backlight detection result and to improve the precision and accuracy of the backlight detection.

In the embodiments of the present disclosure, the electronic device may include one of the above-described designs or a combination thereof.

The electronic device may be configured to include at least one of the light guide structures 19, the first filter 16, or the conversion component 23 based on actual requirements. The embodiments thereof will not be described individually with the accompanying drawings.

In various embodiments, for example, the photosensitive component 13 may be integrated into the display module 12. In another example, the photosensitive component 13 may also be integrated into the backlight module 11. In this case, the structure of the electronic device is shown in FIG. 12.

Figure 12:
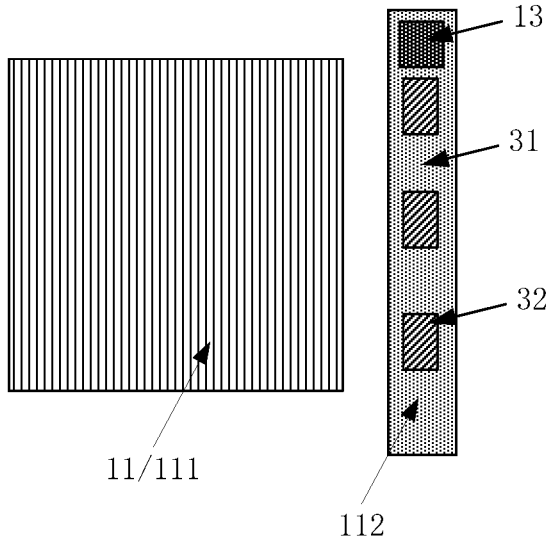
FIG. 12 is a structural diagram of a backlight module according to some embodiments of the present disclosure.

FIG. 12 is a structural diagram of a backlight module according to some embodiments of the present disclosure. FIG. 12 is a top view of the backlight module 11 in a backlight emission direction. In this case, photosensitive component 13 is integrated in the backlight module 11. Specifically, the backlight module 11 includes the light-emitting component 112 and the light guide component 111. The light guide component 111 is used to guide the backlight based on the light emitted from the light-emitting component 112. The photosensitive component 13 is disposed on the light-emitting component 112.

FIG. 12 illustrates the backlight module 12 of an edge-type light source. The light-emitting component 112 is located on a side of the light guide component 111. The light-emitting component 112 includes a circuit board 31 and a plurality of light sources 32 arranged on the circuit board 31. The plurality of light sources 32 may be LEDs.

In some embodiments, photosensitive component 13 may be a photosensitive chip, and the circuit board 31 of the plurality of light sources 32 may be directly reused to accommodate the photosensitive component 13. The sampling wavelength of the photosensitive chip is approximately between 400 nm and 500 nm. In some embodiments, the sampling wavelength is approximately between 440 nm and 460 nm.

Figure 13:
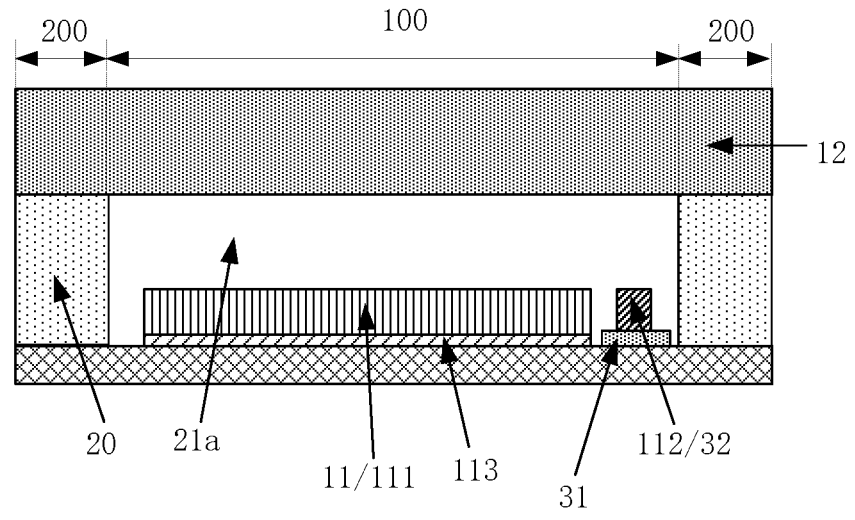
FIG. 13 is a structural diagram of another electronic device according to some embodiments of the present disclosure.
Figure 14:
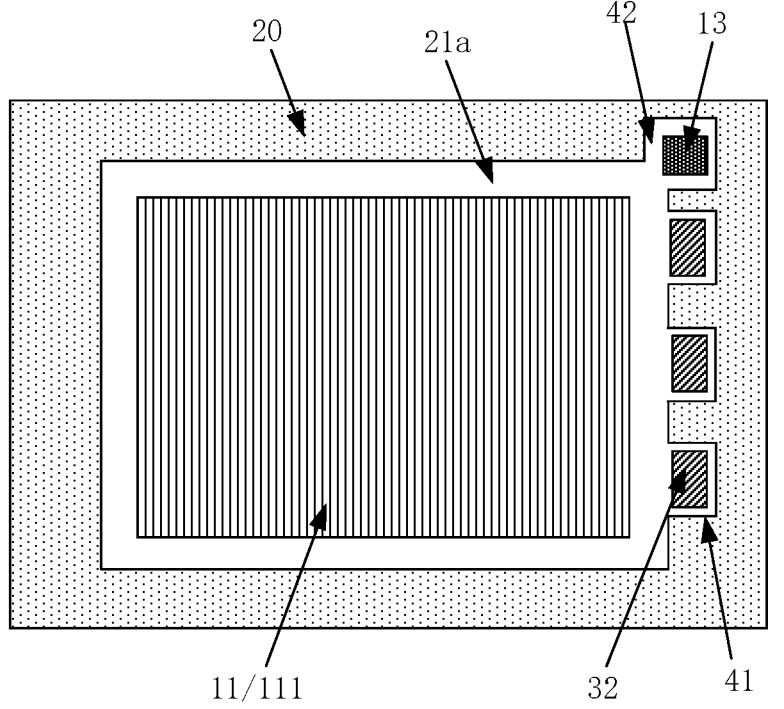
FIG. 14 is a top view of a frame of a backlight module in an electronic device according to some embodiments of the present disclosure.

FIG. 13 is a structural diagram of another electronic device according to some embodiments of the present disclosure. FIG. 14 is a top view of a frame of a backlight module in an electronic device according to some embodiments of the present disclosure. In some embodiments, the electronic device includes the display area 100 and the non-display area 200 surrounding at least one side of the display area 100. The periphery of the surface of the display module 12 facing toward the backlight module 11 is mounted and fixed on frame 20. Frame 20 includes the accommodation space 21a for accommodating the backlight module 11. The periphery of the display module 12 is located in the non-display area 200. A first groove 41 for accommodating the plurality of light sources 32 and a second groove 42 for accommodating the photosensitive component 13 are provided on a side wall of the accommodation space 21a. The first groove 41 and the second groove 42 are located in different areas of the side wall. Photosensitive component 13 includes a photosensitive surface facing toward the accommodation space 21a.

The plurality of light sources 32 are accommodated in the first groove 41. The photosensitive component 13 is accommodated in the second groove 42. Thus, the mounting space of the plurality of light sources 32 and the photosensitive component 13 can be saved, the integration level can be improved, and the miniaturization design of the electronic device can be facilitated. To improve the light emission efficiency of the backlight, the reflective component 113 may be provided under the light guide component 111.

In some embodiments, combined with the reflective component 113 or an iron frame at the bottom of the accommodation space 21a, the second groove 42 is a cavity that is closed in all other directions except an opening toward the inside of the accommodation space 21a. The incident amount of the backlight is increased by increasing the opening. To avoid the problem of darkening corners, the opening should not be higher than 1 mm.

The side wall provided with the second groove 42 has a semi-reflective and semi-transmissive optical structure at a position corresponding to the opening of the second groove 42, to ensure the amount of light entering the opening and avoid the problem of darkening corners in the electronic device. The light transmittance of the semi-reflective and semi-transmissive optical structure is not lower than the light transmittance of the display module. For example, the light transmittance is not less than 5%.

The inner surface of the space formed based on the second groove 42 includes a sealing layer to ensure receiving a stable amount of light. The reflectivity of the sealing layer is not less than 70% to reduce the loss of the light sampled by photosensitive component 13.

One photosensitive component 13 may be disposed at each of the two opposite ends of circuit board 31, respectively. One photosensitive component 13 serves as the main photosensitive component, and the other photosensitive component 13 serves as the calibration photosensitive component. When detection values of the two photosensitive components 13 are consistent with their respective calibrated brightness/current curves, an average of the change rates of the two photosensitive components 13 may be used as the sampling value for brightness adjustment. At the same time, arranging the two photosensitive components 13 may also increase system redundancy and reliability of the sampling system.

The backlight brightness is 10-30 times the display brightness of the display module 12. In this case, the photosensitive component 13 is directly disposed in accommodation space 21a for accommodating the backlight module 11. Compared with the conventional external backlight detection scheme based on the display light, this arrangement may improve the sampling accuracy by 10-30 times.

When the photosensitive component 13 is integrated into the backlight module 11, as shown in FIGS. 12 and 14, a photosensitive chip may be mounted on the redundant space at a corner of the circuit board 31 of the plurality of light sources 32 as the photosensitive component 13 for detecting the backlight. As described above, the backlight detection results are related to the display of the electronic device. The electronic device may adjust the backlight parameters of the backlight module 11 and/or the display parameters of the display module 12 based on the backlight detection results to solve the problem of the display brightness deviation and/or the display color deviation.

As can be seen from the above description, the electronic device provided by the embodiments of the present disclosure integrates the photosensitive component 13 capable of detecting the backlight. The photosensitive component 13 is integrated in the display module 12 or the backlight module 11 to utilize the existing redundancy in the electronic device. The photosensitive component 13 has desired structural compatibility and manufacturing process compatibility with existing liquid crystal display devices, which facilitates the miniaturization design of the electronic device and reduces the manufacturing cost. Moreover, high-precision backlight detection can be achieved based on the photosensitive component 13, the product structure is simple, and the production cost is low. Moreover, the technical solution of the present disclosure may be used to achieve high-precision display adjustment based on a low-precision photosensitive solution.

Each embodiment in this specification is described in a progressive, parallel, or a combination of progressive and parallel manner. Each embodiment focuses on its differences from other embodiments. The same and similar parts among various embodiments are mutually referenced.

It should be noted that in the description of the present disclosure, the descriptions of the drawings and embodiments are illustrative rather than restrictive. The same drawing reference numerals identify the same structures throughout the description of the embodiments. In addition, drawings may exaggerate the thickness of some layers, films, panels, areas, etc., for purposes of understanding and ease of description. It should also be understood that when an element such as a layer, film, region, or substrate is referred to as being "on" another element, it can be directly on the other element or intervening elements may be present. In addition, "on" refers to positioning an element on or below another element, but does not essentially mean positioning on the upper side of another element according to the direction of gravity.

The orientation or positional relationship indicated by the terms "upper," "lower," "top," "bottom," "inner," "outer," etc. are based on the orientation or positional relationship shown in the drawings, and are merely for the convenience of describing the present disclosure and simplified description, rather than indicating or implying that the device or element referred to must have a specific orientation, be constructed and operated in a specific orientation, and therefore cannot be construed as a limitation of the present disclosure. When a component is said to be "connected" to another component, it may be directly connected to the other component or there may be an intermediate component present at the same time.

It should also be noted that in this specification, relational terms such as first and second are merely used to distinguish one entity or operation from another entity or operation, and do not necessarily require or imply such relationship or sequence between these entities or operations. Further, the terms "comprises," "includes," or any other variation thereof are intended to cover a non-exclusive inclusion, such that an article or device including a list of elements includes not only those elements, but also other elements not expressly listed. Or it also includes elements inherent to the article or device. Without further limitation, an element defined by the statement "comprises a . . . " does not exclude the presence of other identical elements in an article or device that includes the above-described element.

The above description of the disclosed embodiments enables those skilled in the art to implement or use the present disclosure. Various modifications to these embodiments will be readily apparent to those skilled in the art, and the generic principles defined herein may be practiced in other embodiments without departing from the spirit or scope of the present disclosure. Therefore, the present disclosure is not to be limited to the embodiments shown herein but is to be accorded the broadest scope consistent with the principles and novel features disclosed herein.

What is claimed is:

1. An electronic device, comprising:
a backlight module configured to emit a backlight;
a display module disposed on a light-emitting side of the backlight module and configured to emit a display light based on the backlight, the display module including:
a first substrate; and
a semiconductor structure array and a pixel structure array disposed on a side of the first substrate facing away from the backlight module, the semiconductor structure array being disposed between the first substrate and the pixel structure array and including:
a first semiconductor structure array configured to control pixel structures in the pixel structure array to convert the backlight into the display light; and
a second semiconductor structure array configured to function as a photosensitive component to detect the backlight and generate a current representing a backlight intensity based on light irradiation from the backlight; and
a light guide structure including:
a first end facing the backlight module;
a second end facing the second semiconductor structure array;
wherein the light guide structure is configured to collect the backlight at the first end, guide the collected backlight along a light transmittance path defined by the light guide structure, and emit the guided backlight from the second end to the second semiconductor structure array.

2. The electronic device according to claim 1, wherein:
a first light shielding component is provided on the first substrate;
the first light shielding component is located on a path in which the backlight irradiates on a target area of first semiconductor structures in the first semiconductor structure array; and
the first light shielding component is located outside a path in which the backlight irradiates on the target area of second semiconductor structures in the second semiconductor structure array.

3. The electronic device according to claim 2, wherein:
in a direction perpendicular to a plane of the first substrate, the target area of the first semiconductor structures and the first light shielding component at least partially overlap, and the target area of the second semiconductor structures and the first light shielding component do not overlap.

4. The electronic device according to claim 1, wherein:
a second light shielding component is disposed on a surface of the second semiconductor structures in the second semiconductor structure array facing away from the backlight module.

5. The electronic device according to claim 1, wherein:
a first filter is disposed on a path in which the backlight irradiates on the photosensitive component; and
the first filter is configured to pass a first color light in the backlight, such that the second semiconductor structure array detects intensity of the first color light in the backlight.

6. The electronic device method according to claim 5, wherein:
a second substrate is provided on a light-emitting side of the pixel structure array;
a second filter is provided on a surface of the second substrate facing toward the pixel structure array; and
the second filter is used to pass the first color light in the display light,
wherein the first filter and the second filter share same manufacturing process parameters.

7. The electronic device according to claim 1, wherein:
the electronic device includes a display area and a non-display area surrounding at least one side of the display area;
the first semiconductor structure array is located in the display area, and the second semiconductor structure array is located in the non-display area;
a periphery of the surface of the display module facing toward the backlight module is fixedly mounted on a frame;
the frame includes an accommodation space for accommodating the backlight module;
the light guide structure is embedded in a body of the frame;

the frame includes a first opening on its inner wall facing toward the backlight module to expose the first end of the light guide structure; and the frame includes a second opening on its top facing toward the display module to expose the second end of the light guide structure.

8. The electronic device according to claim 7, wherein the electronic device supports at least one of the following designs:

in a first design, a surface of the first end or the second end is provided with a conversion component for converting the backlight into an infrared light, and the photosensitive component detects the backlight based on the infrared light;

in a second design, the second end includes a light converging structure, and the light converging structure is used to converge the light in the light guide structure, and the converged light irradiates on the photosensitive component; and in a third design, the second semiconductor structure array includes at least two semiconductor structures.

9. The electronic device according to claim 1, wherein the backlight module comprises:

a light-emitting component; and a light guide component configured to guide the backlight based on light emitted from the light-emitting component.

10. The device according to claim 9, wherein:

the electronic device includes a display area and a non-display area surrounding at least one side of the display area;

a periphery of the surface of the display module facing toward the backlight module is fixedly mounted on a frame;

the frame includes an accommodation space for accommodating the backlight module;

the periphery is located in the non-display area;

a first groove for accommodating a plurality of light sources in the light-emitting component.

* * * * *